July 3, 1956
C. M. EASON
2,753,032
FRICTION DISK CONSTRUCTION FOR
CLUTCHES, BRAKES AND THE LIKE
Filed April 18, 1952
3 Sheets-Sheet 2
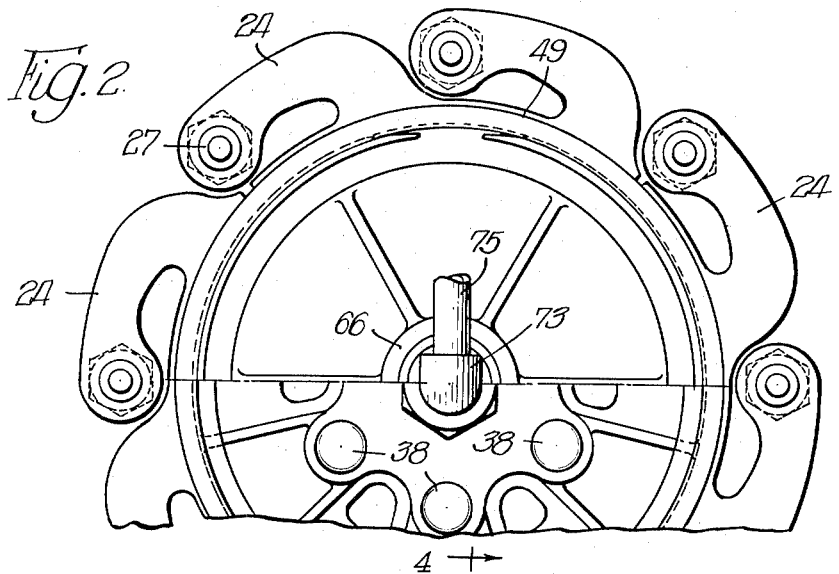
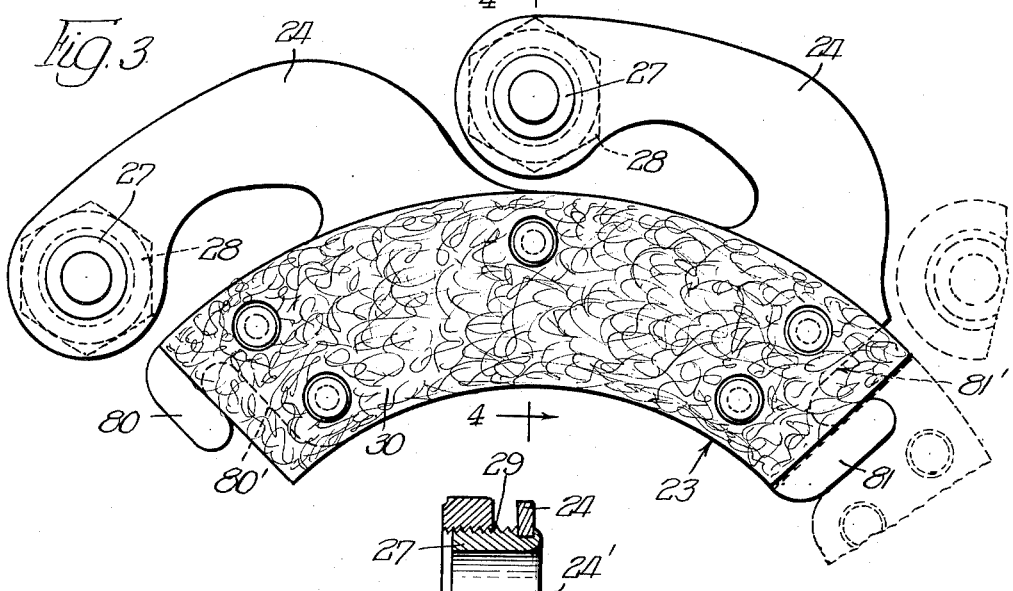
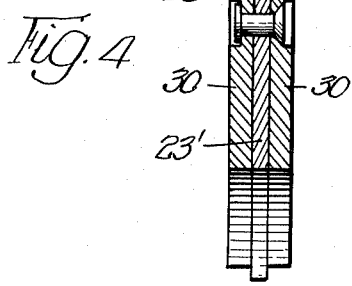
INVENTOR.
Clarence M. Eason,
BY Brown, Jackson,
Boettcher & Dienner
Attys.

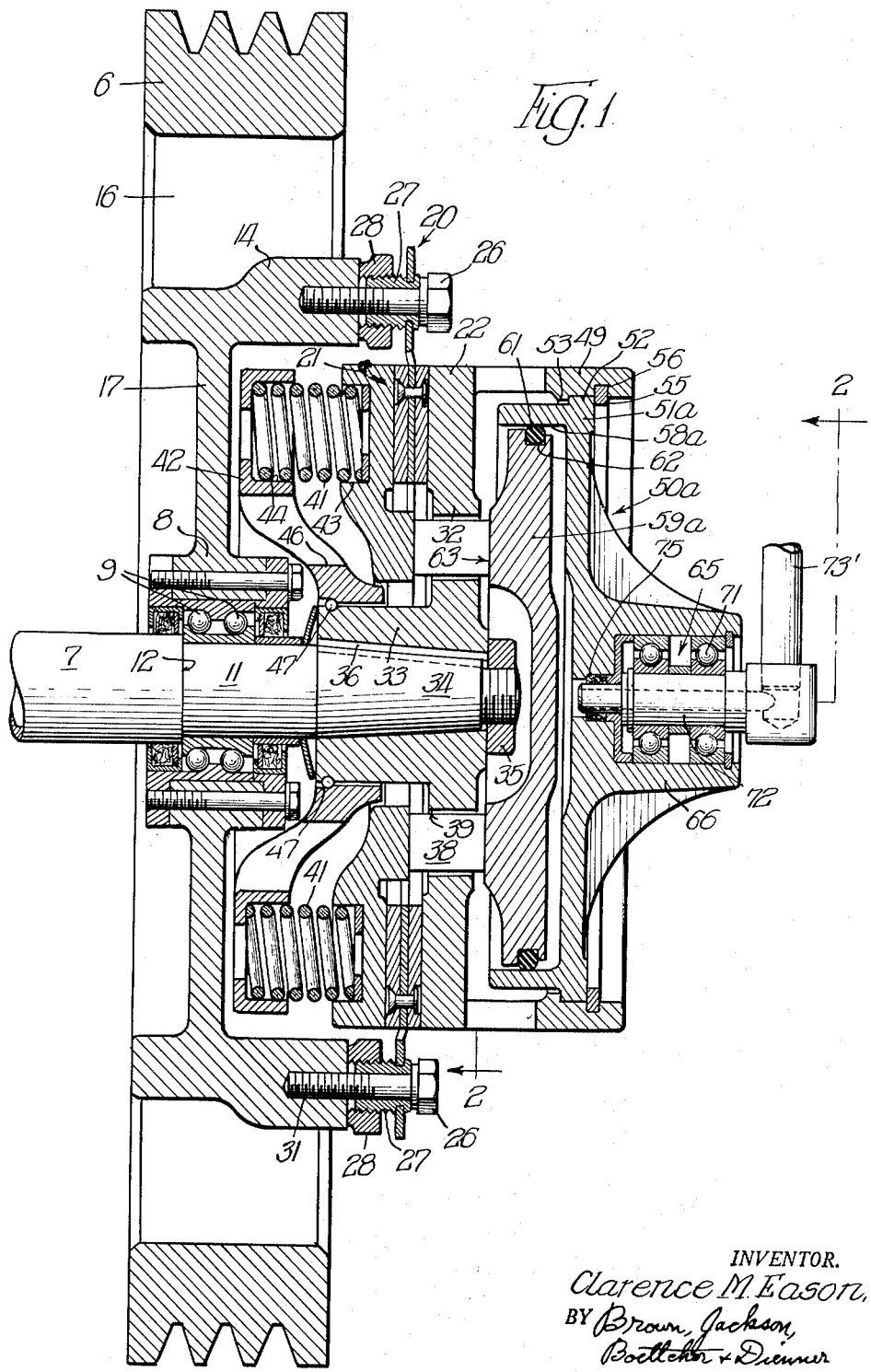

July 3, 1956
C. M. EASON
2,753,032
FRICTION DISK CONSTRUCTION FOR
CLUTCHES, BRAKES AND THE LIKE
Filed April 18, 1952
3 Sheets-Sheet 3
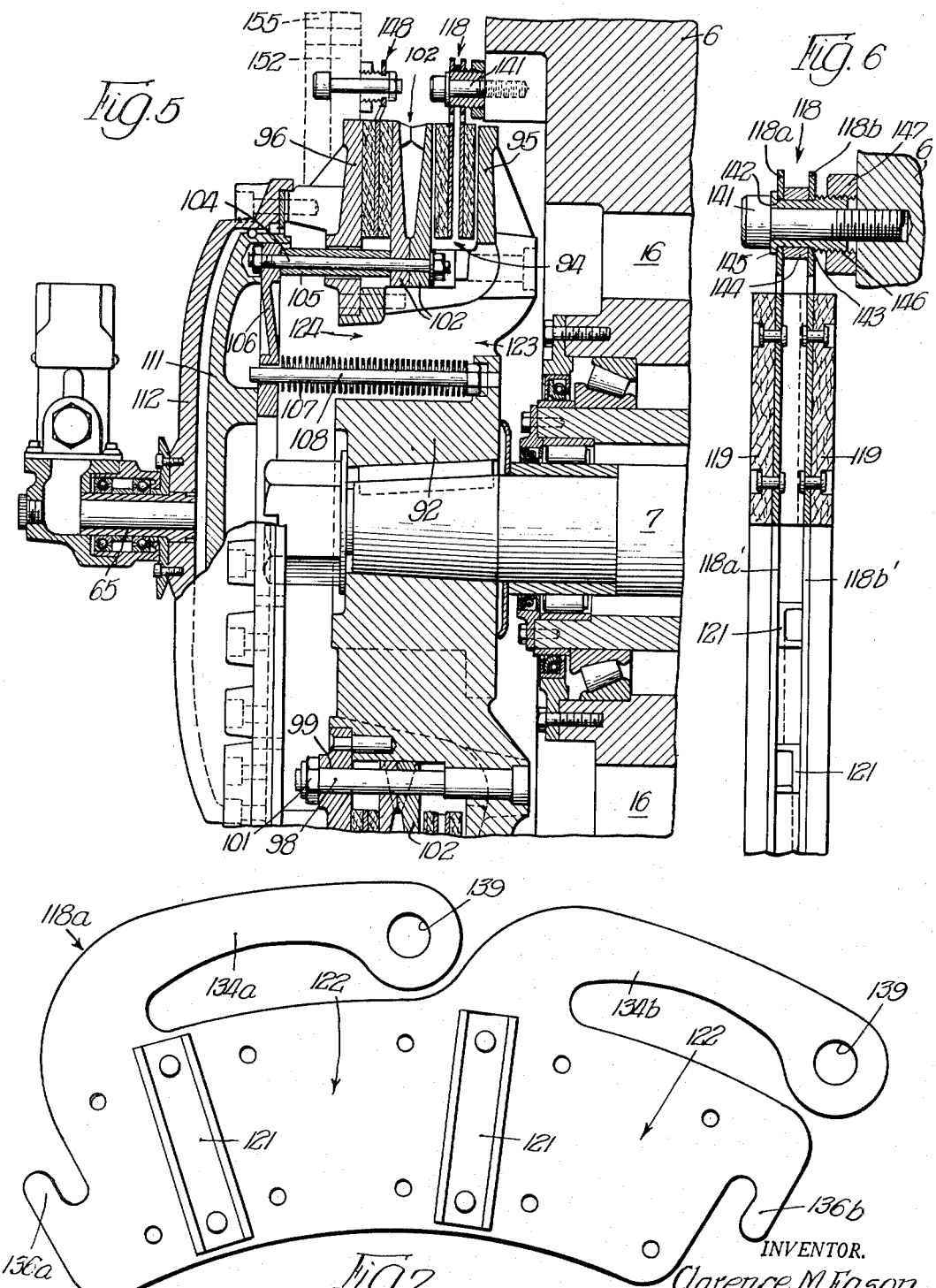
INVENTOR.
Clarence M. Eason,
BY Brown, Jackson,
Boettcher & Dienner

United States Patent Office 2,753,032
Patented July 3, 1956

2,753,032
FRICTION DISK CONSTRUCTION FOR CLUTCHES, BRAKES AND THE LIKE

Clarence M. Eason, Waukesha, Wis., assignor to Industrial Clutch Corporation, Waukesha, Wis., a corporation of Wisconsin Application April 18, 1952, Serial No. 283,072

13 Claims. (Cl. 192—113)

The present invention relates to improvements in friction disk construction for clutches, brakes and the like. The present application is continuation in part of my prior copending applications Serial No. 106,942, filed July 26, 1949, now Patent No. 2,684,742, issued July 27, 1954, and Serial No. 183,404, filed September 6, 1950, now Patent No. 2,674,356, issued April 6, 1954. My improved friction disk construction is of the segmental type made up of a plurality of readily separable arcuate segments so as to facilitate the original assembly and also to facilitate removal and replacement of the disk when refacing the friction surfaces. This improved disk construction can be used in friction clutches as the driving or driven clutch element, and can also be used in friction brakes as the stationary or rotating brake element. The friction disk constructions herein disclosed embody improvements upon the constructions shown in my prior Patent Nos. 2,259,461 and 2,303,201.

One of the objects of the present invention is to provide an improved construction of friction disk of the above type comprising a series of interconnected arcuate segments mounted by flexible mounting fingers which permit lateral shifting movement of the arcuate disk segments in the operations of engaging or releasing the clutch, or engaging or releasing the brake. One of the distinguishing features of these friction disk segments is a unique relation of interlocking fingers formed integrally with the ends of the metallic segments and adapted to have interfitting engagement to connect the adjacent ends of adjacent segments. This is less expensive to manufacture and easier to assemble than the constructions shown in my aforesaid prior Patents Nos. 2,259,461 and 2,303,201, and is equally or more effective for interconnecting the segments.

Another object of the invention is to provide an improved adjustable mounting arrangement at the end of each flexible mounting finger of the segment. In its preferred form, this improved mounting arrangement comprises an externally threaded sleeve or grommet secured to the finger and adapted to pass a cap screw through its center and to receive a jam nut over its threaded exterior. These parts coact to facilitate the mounting of the segments and also to faciltiate the inward or outward "alignment" adjustments relatively to the rotating or stationary element upon which the friction disk segments are mounted.

Another object of the invention is to provide an improved friction disk of hollow ventilated construction for an effective internal circulation of air in immediate proximity to the friction surfaces. When this hollow disk construction is employed as a rotating element of the clutch or brake the hollow ventilated construction is utilized as an air impeller for centrifugally inducing a flow of air into contact with the disk surfaces which are subject to high heating.

Other objects, features and advantages of the invention will be apparent from the following detail description of two preferred embodiments thereof. In the accompanying drawings illustrating such embodiments:

Figure 1 is an axial sectional view of one form of clutch embodying my improved friction disk construction, this embodiment having been originally disclosed in my copending application, Serial No. 106,942, now Patent No. 2,684,742, issued July 27, 1954;

Figure 2 is an end view on a smaller scale, partly in elevation and partly in section, taken approximately on the plane of the line 2—2 of Figure 1;

Figure 3 is an elevational view of one of the improved arcuate disk segments;

Figure 4 is a detail sectional view taken on the plane of the line 4—4 of Figure 3;

Figure 5 is a fragmentary axial sectional view through a combined clutch and brake mechanism embodying the hollow ventilated construction of my improved friction disk, this embodiment being originally disclosed in my copending application Serial No. 183,404, now Patent No. 2,674,356, issued April 6, 1954.

Figure 6 is a fragmentary sectional view of the hollow ventilated construction of disk on a larger scale; and Figure 7 is a fragmentary end view of one of the above disk segments, taken approximately on the plane of the line 7—7 of Figure 6, showing two of the spring fingers and also showing the spacing channels which space the right and left halves of the disk apart in this hollow ventilated construction.

Referring first to the embodiment of the invention illustrated in Figures 1 to 4 inclusive, in this embodiment the invention takes the form of a driving clutch disk for use in a spring loaded, air released clutch for controlling the drive from a driving sheave or fly wheel 6 to a driven shaft 7, as, for example, the crank shaft of an air compressor. The fly wheel drive sheave 6 has a hub portion 8 which is mounted on an anti-friction ball bearing 9. The latter is in turn supported on a reduced portion 11 of the compressor shaft, and is held against a thrust shoulder 12 on the shaft. Formed integrally with the fly wheel casting is an intermediate annular mounting flange 14 which is joined with the fly wheel rim by spokes 16, and with the hub 8 by a web portion 17. This mounting flange 14 is adapted to support the driving clutch element, designated 20 in its entirety, this being the improved friction disk of the present invention. Such driving clutch element 20 is adapted to be clutched between two driven clutch elements 21 and 22, as I shall later describe.

Since the compressor crank shaft and driven clutch elements must remain stationary for long periods while the fly wheel 6 and driving element 20 revolve continuously, it is of the utmost importance that there be no drag or running contact between the friction facing and the driven plates. To insure this condition, the driving clutch element 20 is preferably constructed according to the general teachings of my aforementioned prior Patents Nos. 2,259,461 and 2,303,201, which construction affords a positive axial positioning of the drive disk due to the flexibility of the attaching fingers. In the improved form of disk construction herein disclosed, the disk 20 is made up of a series of arcuate clutch segments 23, best shown in Figures 3 and 4. Flexible mounting fingers 24 project from the periphery of each arcuate segment 23 for mounting on cap screws 26 which thread into the flange 14 of the fly wheel 6. The cap screws pass through externally threaded sleeves or grommets 27 which have riveted mounting in the apertured ends of the fingers 24, and these threaded sleeves or bushings are locked at different positions of inward or outward adjustment by lock nuts 28 which screw over the threaded exteriors 29 of the sleeves or bushings. The opposite sides of this flexible driving disk have layers of friction facing material 30 secured thereto for engagement with the driven clutch elements 21 and 22. These clutch segments 23 will be later described in greater detail in connection with Figures 3 and 4, after describing the remainder of the clutch structure.

In this exemplary clutch structure, chosen for the purpose of illustrating a typical use of my improved friction disk construction 20, the driven clutch element 22 is preferably in the form of a casting having a radially extending web portion 32 and a mounting hub 33. This hub is secured fast to the compressor shaft 7, such as by drawing the hub up on a tapered section 34 of the shaft through a nut 35, and interposing a driven key 36 between matching key ways in the hub and in the shaft.

The other driven clutch plate 21 is also preferably in the form of a casting, and is provided with a plurality of guiding push studs or pins 38 which have sliding guided movement in guide holes 39 formed in the web 32 of the outer clutch plate 22. These guiding push studs 38 compel the two driven clutch plates 21 and 22 to rotate together at all times, but permit the inner clutch plate 21 to be shifted inwardly away from the outer clutch plate 22 in a clutch releasing operation. Such inward shifting movement is normally opposed by a series of helical compression springs 41 which are confined between the inner side of the clutch plate 21 and a spring mounting spider or ring 42. The outer or front ends of these springs seat in circular pockets 43 formed in the back surface of the clutch plate 21, and the inner ends of the springs seat in similar cylindrical pockets 44 formed in the front face of the ring or spider 42. This latter ring or spider has a hub portion 46 which is assembled over the hub portion 33 of the outer clutch plate and is held against displacement therefrom by a snap locking ring 47. It will be seen that the normal tendency of the springs 41 is to hold the clutch engaged by compressing the two driven clutch plates 21 and 22 together against the opposite surfaces of the driving clutch element 20.

One of the features described and claimed in my aforesaid parent application Serial No. 106,942, now Patent No. 2,684,742, issued July 27, 1954, is the ability to use interchangeable sizes of power units for releasing the clutch, whereby a relatively large size of power unit can be used when the available source of compressed air is at a relatively low pressure, say in the neighborhood of 80 to 100 pounds per square inch, whereas a smaller size power unit may be used when the available supply of compressed air is at relatively high pressures, say in the neighborhood ranging from 250 to 1000 pounds per square inch. In Figure 1 I have illustrated the use of a relatively large size power unit, these power units being adapted to be carried by a mounting support in the form of an outwardly extending flange or ring 49 formed integral with the outer driven clutch disk 22. This larger size of power unit designated 50a, for operation by the lower range of air pressures, comprises a mounting head 51a adapted for releasable mounting within the mounting ring 49. The smaller size of power unit for operation by the higher range of air pressures has a similar mounting head for interchangeable mounting within the mounting ring 49, both mounting heads having an identical outer diameter and both being formed with a shouldered offset 52 for abutting against an inwardly extending abutment flange 53 formed in the mounting ring 49. After the mounting head has been inserted into the mounting ring 49, in engagement against the abutment flange 53, the mounting head is held in place by snapping a lock ring 55 into an internal locking groove 56 formed in the mounting ring 49 just on the outer side of the head 51a. This snap locking ring 55 can be readily inserted into and removed from the groove 56 by the operation of an appropriate tool, as is well known.

The mounting head 51a constitutes the head end of a compressed air cylinder 58a, this cylinder formation being bored out in the formation of the cast head 51a. Sliding within the cylinder 58a is a piston 59a. In the smaller size of power unit, the cylinder and piston are of appropriately smaller size for operation by the higher range of pressures. In each case, the piston carries an O-type of sealing ring 61 confined within an annular groove 62 in its periphery, such ring being preferably composed of neoprene synthetic plastic, rubber, or the like. These sealing rings are well known for holding high air pressures. The rear side of the piston is formed with a thrusting surface 63 adapted to abut against the ends of the guided shifter pins 38 for transmitting shifting movement to the driven clutch element 21. A portion of this thrust surface 63 overlies the front face of the hub 33, so that the inward shifting movement of the piston is limited by this thrusting surface striking the front end of the hub 33. Figure 1 illustrates the clutch engaged by the action of the springs 41, which occurs as soon as the compressed air is released from the power cylinder.

The cylinder heads of the different size power units are each provided with a rotating seal 65 through which compressed air is admitted into the cylinder area. The details of this rotating seal are fully disclosed in the aforesaid parent application, Serial No. 106,942, now Patent No. 2,684,742, issued July 27, 1954, and constitute no part of the present invention. Suffice it to say that the rotating seal serves to conduct compressed air from the compressed air supply line 73' into the cylinder 58a through a stationary hollow quill 72 which is mounted in the central boss 66 of the cylinder head upon a pair of laterally spaced ball bearings 71. A neoprene packing ring 75 seals the rotative joint, as fully described in the aforesaid parent application.

Referring now in greater detail to the construction of the clutch segments 23, it will be seen from Figures 3 and 4 that the metallic segment 23' has the two flexible mounting fingers 24 formed integrally therewith, as disclosed in my aforesaid prior Patents Nos. 2,259,461 and 2,303,201. However, I have devised an improved manner of mounting or attaching these fingers to the flywheel 6 or annulus 14 which possesses advantages over the practice shown in my prior patents. The ends of the flexible fingers 24 have circular apertures 24' therein, and riveted in these apertures are the previously described bushings or grommets 27 having external adjusting threads, over which screw the aforementioned lock nuts 28. In mounting the segments, the cap screws 26 are merely passed through the axial openings 27' of the bushings and screwed into tapped holes 31 provided in the flywheel annulus 14. The nuts 28 are then screwed back and forth along the bushings 27 until the flexible fingers 24 are all properly aligned with each other in the desired plane for properly disposing the clutch segments with respect to the two driven clutch elements 21 and 22. After adjusting the nuts 28 to the proper positions along the bushings 27, the adjustments are rigidly locked up by tightening the cap screws 26 inwardly against the outer ends of the bushings. It will be noted that the adjustment of the nuts 28 is comparable to increasing or decreasing the effective lengths of the bushings 27. In this construction, the only tapped bores necessary in the flywheel or annulus are the bores 31; no threaded counterbores are necessary for the threaded bushings.

The adjacent ends of adjacent segments 23 are adapted to be interconnected by interlocking fingers 80 and 81, the finger 80 projecting inwardly from one outer corner of the segment, and the finger 81 projecting outwardly from the opposite inner corner of the segment. Both of these fingers are punched out as integral portions of the metallic segment blank 23', and have a radial length equal to about one-half the radial depth of the segment. Punched out directly behind these fingers are recesses or cavities 80' and 81' which are of approximately the same shape as the opposite fingers. Thus, in the assembly of adjacent segments, the outer finger 80 of one segment is hooked over the inner finger 81 of the next adjacent segment, so as to lie within the finger-shaped pocket 81' behind the finger 81, as indicated in dotted line in Figure 3. This hooking together of the outer and inner fingers of adjacent segments is continued on around the circle until the entire flexible disk has been assembled. The friction facings 30 are extended out to the corners of the segments to overlie or cover the pockets 80' and 81'. Thus, when the fingers are hooked into these pockets they are laterally restrained by the friction facings, so that the fingers cannot become accidentally displaced sidewise from the pockets. It will be noted that each outer finger 80 and its pocket 80' are practically the physical counterparts of each inner finger 81 and its pocket 81'. Also, the segments can be assembled with greater facility by reason of this relation of fingers and pockets.

In Figures 5, 6 and 7 I have shown the above described construction of friction disk embodied in a friction brake mechanism, and have also illustrated the hollow ventilated embodiment of friction disk serving as the driving clutch element of a friction clutch. The disk structure or structures shown in Figures 5, 6 and 7 are divided out of my other parent application Serial No. 183,404, to which attention is directed for the details of the combined clutch-brake mechanism in which the improved friction disk constructions are used. Such clutch-brake mechanism is described in said prior application as being used to control a power shear punch press or the like wherein the power is transmitted to a driving flywheel or belt pulley 6 mounted upon the driven shaft 7 of the power shear punch press. Mounted on the tapered end of the driven shaft, outwardly of the flywheel 6, is a driven hub structure 92 which transmits the driving torque inwardly from the clutch elements to the shaft 7, and also transmits the braking torque outwardly from the shaft 7 to the brake elements. All of the coacting frictional surfaces of both the clutch and the brake are confined within an annular U-shaped channel 94 which is formed around the periphery of the hub structure 92. The inner side of this U-shaped channel 94 is defined by an annular flange 95 formed integrally with the hub structure and projecting outwardly therefrom at the inner side or face of the hub structure. The outer side of the U-shaped channel 94 is defined by a removable annular plate 96 which projects radially outwardly from the outer face of the hub structure, being bolted in place to the hub structure after the laterally shiftable clutch-brake plate has been assembled in place in the U-shaped channel 94. The inner radially extending plate 95 functions as a driven clutch plate or element for coaction with the driving clutch disk, and the outer radially extending plate 96 functions as a rotating brake plate for coaction with the stationary brake disk. The bolting of the outer brake plate flange 96 to the hub structure 92 is effected by through bolts 98 which pass through the flanged inner portion of the clutch hub and through openings 99 in the plate 96, receiving nuts 101 on their outer ends, as shown in the lower half of Figure 5. These through bolts 98 function as guide pins along which the axially shiftable clutch-brake plate 102 has sliding movement. This clutch-brake plate effects clutch engagement when axially shifted in an inward direction, and effects brake engagement when axially shifted in an outward direction. This clutch-brake plate 102 is adapted to be actuated by actuating bolts 104 extending outwardly through spacing sleeves 105 and having attachment at their outer ends to an actuating plate 106. The actuating plate 106 is arranged to be spring urged in an outward direction by a series of compression springs 107 mounted on guide pins 108. The springs 107 normally hold the clutch-brake plate 102 pulled over into its outward clutch releasing, brake engaging position. Reverse movement of the actuating plate 106 and clutch-brake plate 102 into the brake releasing, clutch engaging position, is effected by inward movement of the piston 111 operating within the compressed air cylinder 112, such inward movement of the piston transmitting inward thrusting force against the actuating plate 106. The compressed air cylinder 112 receives compressed air through a rotary seal either of the construction shown in Figure 1 or any suitable construction.

Referring now to the driving clutch disk indicated in its entirety at 118, this disk rotates constantly with the flywheel 6 and thus functions constantly as a centrifugal blower for cooling the clutch and brake parts during the entire operation of the machine. As best shown in Figures 6 and 7, this disk is preferably of composite construction, comprising two laterally spaced disk elements 118a and 118b, and each disk element being made up of a plurality of arcuate segments 118a' and 118b'. Secured to the outer face of each disk or segment is a layer of friction material 119 of asbestos fabric, metallic friction pads, or any other desired material. The two metallic disks, or their arcuate segments, are maintained in laterally spaced relation by radially extending channel members 121 which are riveted, welded, or otherwise secured to the opposing faces of the clutch disk segments, these channel members being alternately secured to the opposite disks and alternately facing in opposite directions, as best shown in Figure 6. The radially extending spaces 122 defined between adjacent channels 121 function as air impelling openings for causing an outward discharge of air from the disk assembly, whereby this continuously rotating driving clutch disk 118 functions much in the manner of a centrifugal blower for causing a relatively high velocity discharge of a large volume of air through the composite disk structure. Entering air has ready access to the inner peripheral edge of this continuously rotating clutch disk by way of the ventilating openings 123 and 124 conducting air into the U-shaped channel space 94. Because this composite clutch disk 118 is disposed on the outer side of the flywheel 6, circulating air has more ready access thereto, and this flow of air is further augmented by the air which passes outwardly through the circulating holes 16 in the web of the flywheel.

Referring to the laterally flexible mounting of this composite clutch disk 118 on the flywheel 6, the disk segments 118a' and 118b' have mounting fingers 134a and 134b formed integral with the disk segments and projecting peripherally outwardly and then annularly in the direction of rotation (Figure 2) substantially the same as described in connection with Figure 3. The opposite ends of each metallic segment have oppositely facing interlocking fingers 136a and 136b, the outwardly facing finger of one segment interlocking with the inwardly facing finger of the adjacent segment for establishing a tie connection between segments substantially the same as previously described in connection with the fingers 80 and 81 of Figure 3. For facility of mounting and removal, the clutch disk is preferably made up of two diametrically separating half sections, wherein each half section is made up of a plurality of segments like those shown in Figure 7, which segments are joined together by half rings (180°) of friction facing material 119 riveted to the segments, the friction material flexibly tieing the segments together. The ends of the mounting fingers 134a and 134b have apertures 139 therein for effecting bolting attachment to the flywheel 6 substantially in the same adjustable manner as previously described in connection with Figures 1–4. That is to say, this bolting attachment is adjustable to enable the bolted ends of the mounting fingers to be displaced inwardly or outwardly relatively to the flywheel, so as to obtain the automatic separating release between the friction clutch surfaces when the clutch is released. The bolting attachment is effected by cap screws 141 which pass through adjusting sleeves 142 mounted in the apertures 139 of the spring fingers, the inner ends of said cap screws then threading into the web of the flywheel. The staked mounting of the adjusting sleeve 142 in the apertures 139 is shown in Figure 6, from which it will be seen that the inner flexible mounting finger abuts a shoulder 143 on the sleeve 142, and a spacer bushing 144 is interposed between the inner and outer fingers, whereupon the outer end of the sleeve is then swaged or crimped over the outer side of the outer flexible finger, as indicated at 145. This anchors both flexible fingers to the adjusting sleeve in properly spaced relation. The sleeve has a threaded inner end 146 over which screws and adjusting nut 147, which functions as an adjustable abutment adapted to abut the adjacent surface of the flywheel web, substantially in the manner described of the preceding embodiment. Screwing the nut 147 inwardly or outwardly along the threaded sleeve serves to adjust the position of the sleeve outwardly or inwardly with respect to the flywheel, and thereby to adjust the normal unflexed positions of the clutch disk segments. Any such adjusted position of the adjustment sleeve 142 can be locked by tightening the cap screw 141. It will be seen that the cap screws 141 and the adjusting nuts 147 are both readily accessible at the outer or front side of the flywheel, because this entire clutch assembly is disposed on the outer side of the flywheel. Figure 5 illustrates the position of the parts when the clutch is released and the brake is engaged, at which time the clutch disks are in their normal unflexed positions out of frictional contact with the driving clutch plate 95 and the clutch-brake plate 102.

Referring now to the laterally flexible stationary brake disk 148 which is disposed between the outer radially extending brake plate 96 and the clutch-brake plate 102, this brake disk can be of the same construction as previously described of the clutch disk illustrated in Figures 1–4. That is to say, this brake disk is likewise composed of a plurality of arcuate segments having frictional material on their opposite faces and mounted by spring fingers exactly the same as the spring fingers of the clutch disk segments. However, the spring fingers of the brake disk face in the opposite direction from the spring fingers of the clutch disk because it is desirable that the driving torque and the braking torque always act as a tension stress in the spring fingers, and these two torques necessarily act in opposite directions. The stationary brake disk 148 is adjustably anchored to a stationary brake support ring 152 which is disposed just outside the plane of the stationary brake disk 148, where it completely surrounds the rotating brake plate 96. This stationary brake support ring 152 is suitably fastened to a supporting bracket 155 which is anchored to the frame or body of the machine in such relation as to stationarily hold the brake disk 148 and sustain the heavy braking torque transmitted through this disk. The spring fingers of the brake disk segments are mounted for inward and outward adjustment relatively to the brake support ring 152 through the same adjusting arrangement as previously described in connection with Figures 1 to 4 inclusive. In the brake engaged position of the parts shown in Figure 5, it will be seen how the brake disk is flexed outwardly with respect to the anchored ends of the spring fingers. When the brake is released the brake disk automatically shifts inwardly to lie substantially in the plane of the anchored ends of the fingers. By virtue of the disposal of the stationary brake disk outwardly of the clutch disk and outwardly of the flywheel, the adjustments for adjusting the anchored positions of the spring fingers are readily accessible at the time of assembly and at any future time for taking up wear.

While I have illustrated and described what I regard to be the preferred embodiments of the present invention, nevertheless it will be understood that such are merely exemplary and that numerous modifications and rearrangements may be made therein without departing from the scope of the invention.

I claim:

1. In a clutch adapted to connect two rotary members, the combination of a clutch disk carried by one of said rotary members and adapted to engage a co-operating clutch element carried by the other rotary member, said clutch disk comprising a plurality of segmental sections separately removable and replaceable in the clutch assembly, each of said sections comprising a plurality of flexible mounting arms, threaded bushings having rigid non-rotative attachment to said mounting arms and adapted to receive cap screws passing therethrough and threading into tapped holes in the rotary member upon which said clutch disk is mounted, and adjusting nuts screwing over said threaded bushings between said mounting arms and said latter rotary member and adapted for abutment against said rotary member to adjust the alignment and axial position of said clutch segments.

2. In a clutch segment of the class described, the combination of an arcuate stamping, an outer inwardly directed finger projecting inwardly from an outer corner of said stamping, an inner outwardly directed finger projecting outwardly from an inner corner of said stamping, pockets of corresponding form punched out of said stamping behind each finger, the outer finger of one stamping adapted to have interlocked hooking engagement with the inner finger of the next adjacent clutch segment, and friction clutch facing material secured upon opposite sides of said stamping and overlying said pockets to prevent lateral displacement of the fingers of adjacent segments from said pockets.

3. A clutch segment of the class described comprising an arcuate metallic plate, flexible mounting arms projecting outwardly therefrom, an outer inwardly directed finger projecting inwardly from an outer corner of said plate, an inner outwardly directed finger projecting outwardly from an inner corner of said plate, pockets of an outline corresponding to said fingers formed in said plate behind each finger, and friction clutch facing material on said plate.

4. A clutch segment of the class described comprising an arcuate metallic plate, flexible mounting arms projecting outwardly therefrom, an outer inwardly directed finger projecting inwardly from an outer corner of said plate, an inner outwardly directed finger projecting outwardly from an inner corner of said plate, pockets of an outline corresponding to said fingers formed in said plate behind each finger, and friction clutch facing material upon opposite sides of said plate and overlying said pockets to prevent lateral displacement from said pockets of the fingers of adjacent clutch segments.

5. In a segmental friction disk for establishing frictional engagement between two relatively rotatable members in a friction clutch or brake mechanism, the combination of a plurality of segmental disk sections separately removable and replaceable in said mechanism, each of said segmental sections comprising a plurality of flexible mounting arms, threaded bushings having riveted non-rotative attachment in said mounting arms and projecting inwardly fixed distances from said mounting arms, cap screws passing therethrough and threading into tapped holes in the relatively rotatable latter rotary member upon which said friction disk is mounted, and adjusting nuts screwing over said threaded bushings and adapted for abutment against said member to adjust the alignment and axial position of said disk segments.

6. In a segmental friction disk for establishing frictional engagement between two relatively rotatable members in a friction clutch or brake mechanism, the combination of a plurality of segmental disk sections separately removable and replaceable in said mechanism, centrifugal air impelling passageways in said segmental disk sections for establishing the circulation of air through said friction disk, flexible mounting arms extending outwardly from said segmental disk sections, tubular bushings passing through aligned apertures in the outer ends of said flexible mounting arms and being rigidly fastened to said mounting arms, and spacer bushings mounted on said tubular bushings between said flexible mounting arms.

7. In a segmental friction disk for establishing frictional engagement between two relatively rotatable members in a friction clutch or brake mechanism, the combination of a plurality of segmental disk sections, centrifugal air impelling passageways in said segmental disk sections for establishing a circulation of air therethrough, each of said segmental sections comprising a plurality of flexible mounting arms, means for attaching said mounting arms to one of said two relatively rotatable members, and means for connecting adjacent ends of adjacent segments comprising an outer finger projecting inwardly from an outer corner of each segmental section, and an inner finger projecting outwardly from an inner corner of each segmental section, said outer and inner fingers adapted to have interlocking hooking engagement between adjacent segmental sections.

8. In a segmental friction disk for establishing frictional engagement between two relatively rotatable members in a friction clutch or brake mechanism, the combination of a plurality of segmental disk sections separately removable and replaceable in said mechanism, radially extending air circulating passageways in said segmental disk sections for centrifugally inducing an outward flow of air through said sections, each of said segmental sections comprising a plurality of flexible mounting arms, threaded tubular bushings having riveted non-rotative attachment in said mounting arms and projecting inwardly fixed distances from said mounting arms, cap screws passing therethrough and threading into tapped holes in the relatively rotatable member upon which said friction disk is mounted, and adjusting nuts screwing over said threaded bushings and adapted for abutment against said latter rotary member to adjust the alignment and axial position of said disk segments.

9. In a segmental friction disk for establishing frictional engagement between two relatively rotatable members in a friction clutch or brake mechanism, the combination of a plurality of segmental disk sections separately removable and replaceable in said mechanism, radially extending air circulating passageways in said segmental sections for centrifugally inducing an outward flow of air through the friction disk, each of said segmental sections comprising a plurality of flexible mounting arms, threaded bushings carried by said mounting arms and adapted to receive cap screws passing therethrough and threading into tapped holes in the relatively rotatable member upon which said friction disk is mounted, adjusting nuts screwing over said threaded bushings and adapted for abutment against said member to adjust the alignment and axial position of said disk segments, and means for interconnecting adjacent ends of adjacent segmental sections comprising an outer finger projecting inwardly from an outer corner of each segmental section, and an inner finger projecting outwardly from an inner corner of each segmental section, said outer and inner fingers adapted to have interlocking hooking engagement between adjacent segmental sections.

10. In a segmental friction disk for establishing frictional engagement between two relatively rotatable members in a friction clutch or brake mechanism, the combination of a plurality of segmental disk sections, each of said segmental sections comprising two arcuate metallic plates having frictional material on their outer surfaces and having their inner surfaces disposed back-to-back, spacer members secured to said inner surfaces to maintain said back-to-back inner surfaces in separated relation for establishing air circulating passageways through said friction disk, each of said segmental sections comprising a plurality of flexible mounting arms, tubular bushings passing through aligned apertures in the outer ends of said flexible mounting arms and being rigidly fastened to said mounting arms, spacer bushings mounted on said tubular bushings between said flexible mounting arms, and means passing through said tubular bushings for attaching said mounting arms to one of said rotary members.

11. In a segmental friction disk for establishing frictional engagement between two relatively rotatable members in a friction clutch or brake mechanism, the combination of a plurality of segmental disk sections, each of said segmental sections comprising two arcuate metallic plates having frictional material on their outer surfaces and having their inner surfaces disposed back-to-back, spacer members secured to said inner surfaces to maintain said back-to-back inner surfaces in separated relation for establishing air circulating passageways through said friction disk, each of said segmental sections comprising a plurality of flexible mounting arms, means for attaching said mounting arms to one of said rotary members, and means for connecting adjacent ends of adjacent segmental sections comprising an outer finger projecting inwardly from an outer corner of each segmental section, and an inner finger projecting outwardly from an inner corner of each segmental section, said outer and inner fingers adapted to have interlocking hooking engagement between adjacent segments.

12. In a segmental friction disk for establishing frictional engagement between two relatively rotatable members in a friction clutch or brake mechanism, the combination of a plurality of segmental disk sections separately removable and replaceable in said mechanism, each of said segmental sections comprising two arcuate metallic plates having frictional material on their outer surfaces and having their inner surfaces disposed back-to-back, channel members secured to said inner surfaces and extending substantially radially of said segmental sections to maintain said back-to-back inner surfaces in separated relation for establishing radially extending air circulating passageways through said segmental sections, each of said segmental sections comprising a plurality of flexible mounting arms, threaded bushings carried by said mounting arms and adapted to receive cap screws passing therethrough and threading into tapped holes in the relatively rotatable member upon which said friction disk is mounted, adjusting nuts screwing over said threaded bushings and adapted for abutment against said member to adjust the alignment and axial position of said disk segments, and means for interconnecting adjacent ends of adjacent segmental sections comprising an outer finger projecting inwardly from an outer corner of each segment, and an inner finger projecting outwardly from an inner corner of each segment, said outer and inner fingers adapted to have interlocking hooking engagement between adjacent segmental sections.

13. In a friction disk segment of the class described, flexible mounting arms projecting outwardly therefrom, threaded bushings carried by said mounting arms and adapted to receive cap screws passing therethrough for mounting the friction segment upon the clutch or brake member, adjusting nuts screwing over said threaded bushings and adapted for abutment against said member to adjust the alignment and axial position of said segment, and means for connecting adjacent ends of adjacent segments comprising an outer finger projecting inwardly from an outer corner of the segment, and an inner finger projecting outwardly from an inner corner of the segment, whereby outer and inner fingers of adjacent segments are adapted to have interlocking hooking engagement for tieing adjacent segments together.

References Cited in the file of this patent

UNITED STATES PATENTS

| Number | Name | Date |
|---|---|---|
| 797,578 | Holcomb | Aug. 22, 1905 |
| 2,097,922 | Hodgson | Nov. 2, 1937 |
| 2,177,362 | Eason | Oct. 24, 1939 |
| 2,184,506 | Eason | Dec. 26, 1939 |
| 2,237,624 | Oldham | Apr. 8, 1941 |
| 2,303,201 | Eason | Nov. 24, 1942 |
| 2,345,244 | Eason | Mar. 28, 1944 |